United States Patent
Ashraf (10) Patent No.: US 10,011,929 B2
(45) Date of Patent: Jul. 3, 2018

(54) NONWOVEN SUBSTRATE COMPRISING FIBERS COMPRISING AN ENGINEERING THERMOPLASTIC POLYMER

(71) Applicant: The Procter & Gamble Company, Cincinnati, OH (US)

(72) Inventor: Arman Ashraf, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/407,301

(22) Filed: Jan. 17, 2017

(65) Prior Publication Data

US 2017/0121872 A1    May 4, 2017

Related U.S. Application Data

(63) Continuation of application No. 14/299,050, filed on Jun. 9, 2014, now Pat. No. 9,580,845.

(51) Int. Cl.
| | |
|---|---|
| *D04H 1/4291* | (2012.01) |
| *D04H 1/42* | (2012.01) |
| *D04H 3/147* | (2012.01) |
| *D04H 1/4374* | (2012.01) |
| *D04H 1/4382* | (2012.01) |
| *D04H 1/541* | (2012.01) |
| *D01D 5/098* | (2006.01) |
| *D04H 1/435* | (2012.01) |

(52) U.S. Cl.
CPC ......... *D04H 1/4291* (2013.01); *D01D 5/0985* (2013.01); *D04H 1/42* (2013.01); *D04H 1/435* (2013.01); *D04H 1/4374* (2013.01); *D04H 1/4382* (2013.01); *D04H 1/541* (2013.01); *D04H 3/147* (2013.01)

(58) Field of Classification Search
None
See application file for complete search history.

(56) References Cited

U.S. PATENT DOCUMENTS

| | | | |
|---|---|---|---|
| 3,338,992 A | 8/1967 | Allison | |
| 3,692,613 A | 9/1972 | Pederson | |
| 3,802,817 A | 4/1974 | Matsuki et al. | |
| 3,849,241 A | 11/1974 | Buntin et al. | |
| 4,405,297 A | 9/1983 | Appel et al. | |
| 4,940,464 A | 7/1990 | VanGompel et al. | |
| 5,092,861 A | 3/1992 | Nomura et al. | |
| 5,167,897 A | 12/1992 | Weber et al. | |
| 5,246,433 A | 9/1993 | Bridges et al. | |
| 5,360,420 A | 11/1994 | Cook et al. | |
| 5,456,982 A * | 10/1995 | Hansen | D01F 8/06 428/370 |
| 5,464,687 A | 11/1995 | Sheth | |
| 5,569,234 A | 10/1996 | Buell et al. | |
| 5,599,335 A | 2/1997 | Goldman et al. | |
| 5,607,798 A | 3/1997 | Kobylivker et al. | |
| 5,643,588 A | 7/1997 | Roe et al. | |
| 5,665,300 A | 9/1997 | Brignola et al. | |
| 5,674,216 A | 10/1997 | Buell et al. | |
| 5,702,551 A | 12/1997 | Huber et al. | |
| 5,897,545 A | 4/1999 | Kline et al. | |
| 5,957,908 A | 9/1999 | Kline et al. | |
| 5,968,025 A | 10/1999 | Roe et al. | |
| 6,107,537 A | 8/2000 | Elder et al. | |
| 6,118,041 A | 9/2000 | Roe et al. | |
| 6,120,487 A | 9/2000 | Buell et al. | |
| 6,120,489 A | 9/2000 | Johnson et al. | |
| 6,153,209 A | 11/2000 | Vega et al. | |
| 6,410,129 B2 | 6/2002 | Zhang et al. | |
| 6,426,444 B2 | 7/2002 | Roe et al. | |
| 6,586,652 B1 | 7/2003 | Roe et al. | |
| 6,617,016 B2 | 9/2003 | Zhang et al. | |
| 6,627,787 B1 | 9/2003 | Roe et al. | |
| 6,825,393 B2 | 11/2004 | Roe et al. | |
| 6,861,571 B1 | 3/2005 | Roe et al. | |
| 7,491,770 B2 | 2/2009 | Autran et al. | |
| 2001/0008675 A1 * | 7/2001 | Meece | A61F 13/49012 428/103 |
| 2001/0019929 A1 | 9/2001 | DeLucia et al. | |
| 2002/0177379 A1 * | 11/2002 | Abed | D01F 8/02 442/364 |
| 2003/0233082 A1 | 12/2003 | Kline et al. | |
| 2007/0224903 A1 * | 9/2007 | Chakravarty | A61F 13/15252 442/361 |
| 2009/0104831 A1 | 4/2009 | Bornemann et al. | |
| 2010/0035497 A1 | 2/2010 | Sierakowski et al. | |
| 2010/0262102 A1 | 10/2010 | Turner et al. | |
| 2010/0262103 A1 | 10/2010 | Turner et al. | |
| 2010/0262105 A1 | 10/2010 | Turner et al. | |
| 2010/0262107 A1 | 10/2010 | Turner et al. | |
| 2012/0034838 A1 | 2/2012 | Li et al. | |

FOREIGN PATENT DOCUMENTS

| | | |
|---|---|---|
| EP | 0645480 | 3/1995 |
| WO | WO 02070803 | 9/2002 |
| WO | WO 2009/080458 | 7/2009 |
| WO | WO 2014/199272 A1 | 12/2014 |

OTHER PUBLICATIONS

International Search Report, PCT/US2015/034772, dated Aug. 26, 2015, 11 pages.

* cited by examiner

*Primary Examiner* — David R Sample
*Assistant Examiner* — Donald M Flores, Jr.
(74) *Attorney, Agent, or Firm* — Wednesday G. Shipp; Andrew J. Hagerty (57) ABSTRACT

A nonwoven substrate comprising a polyolefin and an engineering thermoplastic polymer. The engineering thermoplastic polymer may be present in the nonwoven substrate at a level of between about 1% and about 20% by weight of the nonwoven substrate. The layer of fibers is free of a compatibilizer.

12 Claims, 6 Drawing Sheets

NONWOVEN SUBSTRATE COMPRISING FIBERS COMPRISING AN ENGINEERING THERMOPLASTIC POLYMER

FIELD

The present disclosure generally relates to a nonwoven substrate comprising a layer of fibers, wherein the fibers comprise a polyolefin and an engineering thermoplastic polymer, wherein the layer of fibers is free of a compatibilizer.

BACKGROUND

Engineering Thermoplastic Polymers (ETPs) are a group of materials that have better mechanical and/or thermal properties than the more widely used commodity thermoplastics such as polypropylene (PP) or polyethylene (PE). Presently, ETPs are typically produced in smaller quantities and tend to be used in smaller objects or low-volume applications, such as mechanical parts, rather than for bulk and high-volume ends, such as containers and packaging. However, it has been discovered that inclusion of low quantities of ETPs into commodity thermoplastic polymers may improve functionality and mechanical properties of material, thus providing product improvements and benefits.

Typically, the combination of a polyolefin and an ETP requires the presence of a compatibilizer due to differences in their solubility parameters and immiscibility of such polymers. Thus, typically, compatibilizers are used to improve interfacial adhesion of two immiscible polymers. Compatibilizers are costly and inclusion may increase the overall cost of nonwoven substrates.

Therefore, the present disclosure provides nonwoven substrates comprising at least a layer of fibers, wherein the fibers comprise a polyolefin and an engineering thermoplastic polymer without the presence of a compatibilizer. The present disclosure also provides a laminate comprising nonwoven substrates comprising a layer of fibers, wherein the fibers comprise a polyolefin and an engineering thermoplastic polymer and an additional material.

SUMMARY

In one form, the present disclosure is directed, in part, to a nonwoven substrate comprising a layer of fibers. The fibers may comprise a polyolefin and an engineering thermoplastic polymer, and the engineering thermoplastic polymer may be present in the range of from about 1% to about 20% by weight of the nonwoven substrate. The layer of fibers may be free of a compatibilizer.

In another form, the present disclosure is directed, in part, to a nonwoven substrate comprising essentially of a layer of fibers comprising a polyolefin and an engineering thermoplastic polymer. The engineering thermoplastic polymer may be present in the range of from about 1% to about 20% by weight of the nonwoven substrate.

In still another form, the present disclosure is directed, in part, to a laminate comprising a nonwoven substrate comprising a layer of fibers, the fibers comprising a polyolefin and an engineering thermoplastic polymer. The engineering thermoplastic polymer may present in the range of from about 1% to about 20% by weight of the nonwoven substrate. The layer of fibers may be free of a compatibilizer. The laminate may further comprise an additional material joined to a side of the nonwoven substrate.

BRIEF DESCRIPTION OF THE DRAWINGS

The above-mentioned and other features and advantages of the present disclosure, and the manner of attaining them, will become more apparent and the disclosure itself will be better understood by reference to the following description of non-limiting embodiments of the disclosure taken in conjunction with the accompanying drawings, wherein.

DETAILED DESCRIPTION

Various non-limiting embodiments of the present disclosure will now be described to provide an overall understanding of the principles of the structure, function, and use of the nonwoven substrates described herein. One or more examples of these non-limiting embodiments are illustrated in the accompanying drawings. Those of ordinary skill in the art will understand that the nonwoven substrates described herein and illustrated in the accompanying drawings are non-limiting example embodiments and that the scope of the various non-limiting embodiments of the present disclosure are defined solely by the claims. The features illustrated or described in connection with one non-limiting embodiment may be combined with the features of other non-limiting embodiments. Such modifications and variations are intended to be included within the scope of the present disclosure.

As used herein, the term "absorbent article(s)" refers to consumer products whose primary function is to absorb and retain bodily exudates and wastes. Absorbent articles may refer to pants, taped diapers, adult incontinence products, and/or sanitary napkins (e.g., feminine hygiene products). The terms "diaper" and "pants" are used herein to refer to absorbent articles generally worn by infants, children, and incontinent persons about the lower torso. The term "disposable" is used herein to describe absorbent articles which generally are not intended to be laundered or otherwise restored or reused as an absorbent article (e.g., they are intended to be discarded after a single use and may also be configured to be recycled, composted, or otherwise disposed of in an environmentally compatible manner).

"Bicomponent" refers to fiber having a cross-section comprising two discrete polymer components, two discrete blends of polymer components, or one discrete polymer component and one discrete blend of polymer components. "Bicomponent fiber" is encompassed within the term "Multicomponent fiber." A Bicomponent fiber may have an overall cross section divided into two or more subsections of the differing components of any shape or arrangement, including, for example, coaxial subsections, core-and-sheath subsections, side-by-side subsections, radial subsections, etc.

"Monocomponent" refers to fiber formed of a single polymer component or single blend of polymer components, as distinguished from Bicomponent or Multicomponent fiber.

"Multicomponent" refers to fiber having a cross-section comprising more than one discrete polymer component, more than one discrete blend of polymer components, or at least one discrete polymer component and at least one discrete blend of polymer components. "Multicomponent fiber" includes, but is not limited to, "Bicomponent fiber." A Multicomponent fiber may have an overall cross section divided into subsections of the differing components of any shape or arrangement, including, for example, coaxial subsections, core-and-sheath subsections, side-by-side subsections, radial subsections, etc.

As used herein, the term "carded fibers" refer to fibers that are of a discrete length which are sorted, separated, and at least partially aligned by a carding process. For example, a carded substrate refers to a substrate that is made from fibers which are sent through a combing or carding unit, which separates or breaks apart and aligns the fibers in, e.g., the machine direction to form a generally machine direction-oriented fibrous nonwoven web. Carded fibers may or may not be bonded after being carded As used herein, the term "film" refers generally to a relatively nonporous material made by a process that includes extrusion of, e.g., a polymeric material through a relatively narrow slot of a die. The film may be impervious to a liquid and pervious to an air vapor, but need not necessarily be so. Suitable examples of film materials are described in more detail hereinbelow.

As used herein, the term "joined" encompasses configurations wherein an element is directly secured to another element by affixing the element directly to the other element, and configurations wherein an element is indirectly secured to another element by affixing the element to intermediate member(s) which in turn are affixed to the other element.

As used herein, the term "laminate" refers to an element that has at least one nonwoven substrate joined to at least one additional material. The additional material may be a nonwoven, film, elastomeric, or non-elastomeric material. The laminate may have more than one nonwoven substrate joined to the at least one additional material. The nonwoven substrates may be joined to the additional material using bonding techniques or gluing techniques, for example.

As used herein, the term "layer" refers to a sub-component or element of a substrate. A "layer" may be in the form of a plurality of fibers made from a single beam on a multibeam nonwoven machine (for example a spunbond/meltblown/spunbond nonwoven substrate includes at least one layer of spunbond fibers, at least one layer of meltblown fibers, and at least one layer of spunbond fibers) or in the form of a film extruded or blown from a single die.

As used herein, the term "machine direction" or "MD" is the direction that is substantially parallel to the direction of travel of a substrate as it is made. Directions within 45 degrees of the MD are considered to be machine directional. The "cross direction" or "CD" is the direction substantially perpendicular to the MD and in the plane generally defined by the web. Directions within 45 degrees of the CD are considered to be cross directional.

As used herein, the term "meltblown fibers" refers to fibers made via a process whereby a molten material (typically a polymer), is extruded under pressure through orifices in a spinneret or die. High velocity hot air impinges upon and entrains the filaments as they exit the die to form filaments that are elongated and reduced in diameter and are fractured so that fibers of generally variable but mostly finite lengths are produced. This differs from a spunbond process whereby the continuity of the filaments is preserved along their length. An example meltblown process is found in U.S. Pat. No. 3,849,241 to Buntin et al.

As used herein, the term "nonwoven" refers to a porous, fibrous material made from continuous (long) filaments (fibers) and/or discontinuous (short) filaments (fibers) by processes such as, for example, spunbonding, meltblowing, carding, and the like. Nonwoven webs do not have a woven or knitted filament pattern.

As used herein, the term "pant" refers to disposable absorbent articles having a continuous perimeter waist opening and continuous perimeter leg openings designed for infant, child, or adult wearers. A pant may be configured with a continuous or closed waist opening and at least one continuous, closed, leg opening prior to the absorbent article being applied to the wearer. A pant may be preformed by various techniques including, but not limited to, joining together portions of the absorbent article using any refastenable and/or permanent closure member (e.g., seams, heat bonds, pressure welds, adhesives, cohesive bonds, mechanical fasteners, etc.). A pant may be preformed anywhere along the circumference of the absorbent article in the waist region (e.g., side fastened or seamed, front waist fastened or seamed, rear waist fastened or seamed). A pant may be opened about one or both of the side seams and then refastened. Example pants in various configurations are disclosed in U.S. Pat. Nos. 5,246,433, 5,569,234, 6,120,487, 6,120,489, 4,940,464, 5,092,861, 5,897,545, 5,957,908, and U.S. Patent Publication No. 2003/0233082.

As used herein, the term "spunbond fibers" refers to fibers made via a process involving extruding a molten thermoplastic material as filaments from a plurality of fine, typically circular, capillaries of a spinneret, with the filaments then being attenuated by applying a draw tension and drawn mechanically or pneumatically (e.g., mechanically wrapping the filaments around a draw roll or entraining the filaments in an air stream). The filaments may be quenched by an air stream prior to or while being drawn. The continuity of the filaments is typically preserved in a spunbond process. The filaments may be deposited on a collecting surface to form a web of randomly arranged substantially continuous filaments, which may thereafter be bonded together to form a coherent nonwoven layer. Example spunbond process and/or webs formed thereby may be found in U.S. Pat. Nos. 3,338,992, 3,692,613, 3,802,817, 4,405,297, and 5,665,300.

As used herein, the term "substrate" refers to an element that includes at least a fibrous layer and has enough integrity to be rolled, shipped and subsequently processed (for example a roll of a substrate may be unrolled, pulled, taught, folded and/or cut during the manufacturing process of an absorbent article having an element that includes a piece of the substrate). Multiple layers may be bonded together to form a substrate.

As used herein, the term "taped diaper" refers to disposable absorbent articles having an initial front waist region and an initial rear waist region that are not fastened, pre-fastened, or connected to each other as packaged, prior to being applied to the wearer. A taped diaper may be folded about its lateral central axis with the interior of one waist region in surface to surface contact with the interior of the opposing waist region without fastening or joining the waist regions together. Example taped diapers disclosed in various suitable configurations are illustrated in U.S. Pat. Nos. 5,167,897, 5,360,420, 5,599,335, 5,643,588, 5,674,216, 5,702,551, 5,968,025, 6,107,537, 6,118,041, 6,153,209, 6,410,129, 6,426,444, 6,586,652, 6,627,787, 6,617,016, 6,825,393, and 6,861,571.

Modern absorbent articles such as taped diapers, pants, sanitary tissue products, and/or adult incontinence products include many elements that are at one time or another in contact with the caregiver or user's skin. The use of nonwoven substrates is particularly advantageous in such elements due to the soft feel and the cloth-like appearance they provide. Some modern disposable absorbent articles are also designed to provide an underwear-like fit. Conventional nonwoven substrates may comprise combinations of polyolefins, such as polypropylene and/or polyethylene. Other conventional nonwoven substrates may comprise a combination of polyolefins and engineering thermoplastic polymers (ETPs). When high concentrations of ETPs are present in a nonwoven substrate in combination with a polyolefin, a compatibilizer is often necessary due to differences in their solubility parameters and immiscibility of such polymers. Thus, typically, compatibilizers are used to improve interfacial adhesion of two immiscible polymers. Compatibilizers are costly and inclusion may increase the overall cost of nonwoven substrates.

Since manufacturers of nonwoven substrates and products comprising the nonwovens substrates are under continuous pressure to reduce manufacturing cost and minimize manufacturing waste, it is believed that the nonwoven substrates disclosed hereinafter may be a suitable alternative to conventional nonwoven substrates, having improved tensile properties and reduced manufacturing costs, without the presence of compatibilizers.

Further, it is believed the nonwoven substrates of the present invention may provide an increase in nonwoven CD elongation, thus improved extensibility of substrate. Also, it is believed the nonwoven substrates of the present invention may provide an increase in MD Tensile Modulus, thus enabling substrate basis weight reduction without compromising nonwoven converting or increased roll neck-down during unwinding and splicing process during absorbent article manufacturing. The foregoing considerations are addressed by the present disclosure, as will be clear from the detailed disclosure.

The nonwoven substrate of the present invention may be useful in an absorbent article such as a pant, a taped diaper, a feminine hygiene product, and an adult incontinence product The nonwoven substrate may have a basis weight of between about 2 $g/m^2$ (gsm) and about 50 $g/m^2$, between about 4 $g/m^2$ and about 25 $g/m^2$, between about 5 $g/m^2$ and about 20 $g/m^2$, about 13 $g/m^2$, about 17 $g/m^2$, or about 20 $g/m^2$, specifically reciting all 0.1 $g/m^2$ increments within the ranges specified in this paragraph. The nonwoven substrate may have a basis weight of less than about 50 $g/m^2$, less than about 25 $g/m^2$, greater than about 2 $g/m^2$, greater than about 5 $g/m^2$, specifically reciting all 0.1 $g/m^2$ increments within the ranges specified in this paragraph. The basis weight of any of the substrates described herein may be determined using International Nonwovens and Disposables Association ("INDA") method WSP 130.1(05). The basis weight of any of the individual layers described herein, and which together form a substrate, may be determined by running in sequence each of the fiber forming beams that are used to form separate layers and then measuring the basis weight of the consecutive formed layer(s) according to INDA method WSP 130.1(05). The substrate may be harvested from a finished product by any method that does not damage the specimen (e.g. solvent or freeze spray).

It may be advantageous to provide the nonwoven substrate with at least two layers of fibers (each having top and bottom surfaces). The second layer of fibers may be free of engineering thermoplastic polymers. In another embodiment, the second layer of fibers may comprise engineering thermoplastic polymers. The nonwoven substrate may comprise at least one layer of spunbond fibers. The nonwoven substrate may comprise at least two layers of spunbond fibers. Further, the nonwoven substrate may comprise at least one layer of carded fibers. Further, the nonwoven substrate may comprise at least one layer of meltblown fibers. Further, the nonwoven substrate may comprise at least one layer of microfibers. In an embodiment, any of the layers of fibers, including spunbond fibers, carded fibers, meltblown fibers, or microfibers may comprise or be made of monocomponent, bicomponent, or multicomponent fibers.

In an embodiment, the nonwoven substrate may comprise a polyolefin, such as polypropylene or polyethylene. Polyolefins useful in the present disclosure may be present at a level, by weight of the nonwoven substrate, of between about 80% and about 99%, of between about 90% and about 99%, of between about 95% and about 99%. Polyolefins useful in the present disclosure may be present at a level, by weight of the nonwoven substrate, of greater than about 80%, greater than about 90%, greater than about 95%, specifically reciting all 0.1% increments within the above-specified ranges.

The nonwoven substrate may further comprise an engineering thermoplastic polymer. Some engineering thermoplastic polymers that may be used in the present disclosure include Polyesters, Aliphatic Polyesters such as polylactic acid, Aromatic Polyesters, Polyamides, Polyimides, acrylates, methacrylates, styrenics, Polycarbonates (PC), Polytetrafluoroethylene (PTFE/Teflon), Acrylonitrile butadiene styrene (ABS), Polyphenylene oxide (PPO), Polysulphone (PSU), Polyetherketone (PEK), Polyetheretherketone (PEEK), Polyphenylene sulfide (PPS), Polyoxymethylene plastic (POM/Acetal), and polyvinyl chloride or a mixture of two or more of the mentioned compounds, may be used. Engineering thermoplastic polymers useful in the present disclosure may be present at a level, by weight of the nonwoven substrate, of between about 1% and about 20%, of between about 1% and about 10%, of between about 2% and about 7%, of between about 3% and about 5%. Engineering thermoplastic polymers useful in the present disclosure may be present at a level, by weight of the nonwoven substrate, of less than about 20%, less than about 15%, less than about 10%, less than about 7%, less than about 5%, specifically reciting all 0.1% increments within the above-specified ranges.

The nonwoven substrate may comprise fibers comprising an engineering thermoplastic polymer and separate fibers comprising a polyolefin. Further, the nonwoven substrate may comprise fibers comprising both an engineering thermoplastic polymer and a polyolefin.

The nonwoven substrate of the present disclosure may not comprise a compatibilizer. Alternatively, the nonwoven substrate of the present disclosure may consist essentially of a layer of fibers comprising a polyolefin and an engineering thermoplastic polymer. Compatibilizers often used in nonwoven substrates include, but are not limited to Lotader AX8840, available from Arkema (copolymer of ethylene and glycidyl methacrylate; MFR 5 g/10 min); Fusabond M603, available from Dupont (random ethylene copolymer with a monomer classified as being a maleic anhydride equivalent; MFR 25 g/10 min); Elvaloy 1224AC, available from Dupont (copolymer of ethylene and methyl acrylate; MFR 2 g/10 min); Metocene MF650W, available from Lyondell, (maleated polypropylene, MFR 500 g/10 min).

Fibers of the nonwoven substrates of the present disclosure may have a diameter. In an embodiment, the diameter of the fibers may be between about 1 micron and about 50 microns, between about 10 microns and about 40 microns, between about 15 microns and about 35 microns. The diameter of the fibers may be less than about 50 microns, less than about 40 microns, less than about 35 microns, less than about 25 microns. The diameter of the fibers may be greater than about 1 micron, greater than about 10 microns, greater than about 15 microns.

In an embodiment, the nonwoven substrate may comprise a polyolefin, an engineering thermoplastic polymer, and a plasticizer. Plasticizers that may be used in the present disclosure include Citrates, Adipates, Esters, Glycerols, oils, phthalate free plasticizers, bio-based plasticizers, and combinations thereof. Plasticizers useful in the present disclosure may be present at a level, by weight of the nonwoven substrate, of between about 1% and about 20%, between about 3% and about 18%, between about 5% and about 15%. Plasticizers useful in the present disclosure may be present at a level, by weight of the nonwoven substrate, of less than about 20%.

In a further embodiment, the nonwoven substrate may be part of a laminate, such that the nonwoven substrate is bonded to an additional material. In such an embodiment, the nonwoven substrate comprises at least one layer of spunbond fibers having top and bottom surfaces such that the bottom surface of the layer is bonded to top surface or side of the additional material via an adhesive. The nonwoven substrate may comprise additional layers such as at least one layer of meltblown fibers (having top and bottom surfaces) and at least one layer of spunbond fibers (also having top and bottom surfaces) and at least one layer of carded fibers (having top and bottom surfaces) and at least one layer of microfibers (having top and bottom surfaces). The top surface of the layer faces the bottom surface of the layer and the top surface of the layer faces the bottom surface of the layer.

In one embodiment, the additional material may be an elastomeric material, an elastomeric nonwoven substrate, an elastomeric film, or a nonwoven material. The elastomeric material in the form of a film may include a core layer that may be directly bonded to the spunbond layer of the nonwoven substrate. A core layer may be directly bonded to the nonwoven substrate by extruding the elastomeric material directly onto the nonwoven substrate. An adhesive may be added onto the contact surface of the extruded elastomeric material to increase the bond strength between the elastomeric material and the nonwoven substrate. In one embodiment, the elastomeric material may be a non-elastomeric film.

In an embodiment, any of the previously discussed nonwoven layers of spunbond fibers or meltblown fibers may comprise or be made of bicomponent or multicomponent fibers comprising one or more thermoplastic polymers and one or more ETPs. In some embodiments, only the spunbond fibers may comprise or be made of bicomponent or multicomponent fibers. The fibers may each comprise a core and a sheath. The core may be formed from a composition comprising one or more thermoplastic polymers and one or more ETPs. In an embodiment, the thermoplastic polymer may comprise or be a polyolefin, such as polypropylene, and ETP may comprise or be Polylactic acid. The sheath may also be formed from a composition comprising another thermoplastic polymer and another ETP. The sheath may comprise one or more thermoplastic polymers, such as a polyolefin, and may have little (e.g., less than about 20%, less than about 5%, or less than about 3% or no ETP). The polyolefin used to make the core may be different than or the same as the polyolefin used to make the sheath. If two polyolefins are used, both polyolefins may have different melt temperatures and different tensile properties. In an embodiment, each of the two polyolefin polymers used to form the bicomponent fibers may be substantially non-elastic. The two polyolefins may be polypropylene and polyethylene, for example. In an embodiment, the sheath may contain at least about 1% of an ETP, a thermoplastic polymer of the sheath may comprise polyethylene, and a thermoplastic polymer of the core may comprise polypropylene.

Bicomponent or multicomponent fibers with a core comprising the ETP and a sheath free of, or substantially free of, the ETP, may be advantageous in stabilizing melt spinning and continuous fiber formation in case of spunbond process. In an embodiment, a nonwoven substrate in a stretchable laminate may comprise two or more spunbond layers therein. The spunbond layers that will contact the absorbent article manufacturing equipment may contain little or no ETP, while other spunbond layers either in the center of the nonwoven substrate or adjacent to the elastomeric material may comprise between about 1% and about 20% by weight of the ETP. This type of layering of the spunbond layers within the stretchable laminates may help reduce contamination on absorbent article manufacturing equipment caused by potential exposed ETP's since the spunbond layers contacting the absorbent article manufacturing equipment will have little or no ETP's. Such positioning of the spunbond layers within stretchable laminates and/or nonwoven substrates also applies in the same way to the monocomponent fibers (i.e., thermoplastic polymer and ETP without a core/sheath) discussed herein. In an embodiment of a bicomponent fiber, the core may comprise a first amount, by weight, of the ETP and the sheath may comprise a second amount, by weight, of the ETP. The first amount may be the same as or different than the second amount. Further details regarding bicomponent or multicomponent fibers and methods of making the same may be found in U.S. Patent Application Publ. Nos. 2009/0104831, 2010/0262107, 2010/0262105, 2010/0262102, and 2010/0262103.

In an embodiment, a bicomponent or multicomponent fiber may comprise a core formed from a composition comprising one or more elastomeric thermoplastic polymers, such as VISTAMAXX® (available from ExxonMobil, Houston, Tex.), and/or a polylactic acid, for example. The elastomeric thermoplastic polymers, when used to form a core, may provide better stretch properties than typical thermoplastic polymers. Suitable elastomeric thermoplastic polymers are disclosed in U.S. Pat. No. 7,491,770 to Autran et al. Other suitable elastomeric thermoplastic polymers are known to those of skill in the art. The composition may also comprise polypropylene and an ETP in addition to the elastomeric thermoplastic polymer(s). The sheath of the fiber may be formed from a composition comprising one or more thermoplastic polymers and one or more ETP's. The ETP(s) may be present in the composition at a level between about 1% and about 20% by weight of the composition, specifically reciting all 0.5% increments within the above-specified ranges. In an embodiment, the thermoplastic polymer may be polypropylene and the ETP may be polylactic acid. The fibers of the present disclosure (e.g., spunbond fibers) may comprise these bicomponent or multicomponent fibers.

In an embodiment, the nonwoven material may be used in an absorbent article such as a pant or a taped diaper. The absorbent article may comprise a liquid pervious layer, a liquid impervious layer, an absorbent core disposed between the liquid pervious layer and the liquid impervious layer.

The absorbent article may also comprise a stretchable laminate, such as side panels or ears, joined to any of the liquid pervious layer, the liquid impervious layer, and the absorbent core. One or both of the side panels or ears may comprise a fastening element, such as a portion of a hook and loop fastener. The fastening element may be engagable with a landing zone when the absorbent article is donned on a wearer. The nonwoven substrates, in some embodiments, may function as topsheets, backsheets, apertured topsheets, acquisition layers, portions of wings of sanitary napkins, and portions of side panels, ears, and/or fasteners of diapers, for example. Other uses on other nonwoven substrate containing products are also envisioned and are within the scope of the present disclosure.

Compounding Process:

Lyondell Baselle PH835 Polypropylene (PP) Polymer with varying amounts of NatureWorks 6202D PolyLactic Acid (PLA) Polymer are used for these studies. The PLA material is dried at 80 degree Celsius in high vacuum oven for greater than 24 hours and stored in a dry box. Both PP and PLA materials are weighed individually and dry blended to homogeneity. The blends are fed into a Berstorff ZE25 Twin Screw Co-rotating extruder using a fixed feed rate setting. Extruded strands are passed through a water trough for cooling, followed by passing through an air amplifier for air wiping the water off of strands. The strands are cut in pelletizer and collected in a 5 gallon bucket.

The Compounding extruder settings are as follows:

Feed Zone 149 F, Z2 320 F, Z3 330 F, Z4-Z6 340 F, and Z7-Z8 350 F. Screw RPM set at 275 rpm, resulting in a Head melt temperature of 355 F and a head pressure of 364 psi. The vibrational material feeder is set to 75-80% of full scale, resulting in an approximate feed rate of 7 g/sec.

Three blends are compounded:

Example 1: Blend 1 comprises 99% PH835 PP and 1% 6202D PLA (w/w)

Example 2: Blend 2 comprises 97% PH835 PP and 3% 6202D PLA (w/w)

Example 3: Blend 3 comprises 95% PH835 PP and 5% 6202D PLA (w/w)

PLA 6202D can be obtained from NatureWorks LLC, 15305 Minnetonka Blvd., Minnetonka, Minn. 55345.

Polypropylene Pro-fax PH835 can be obtained from LyondellBasell Industries Holdings, Equistar Chemicals LP 11530 Northlake Drive Cincinnati, Ohio 45249.

Spunbond Nonwoven Process:

Fibers for this process are made by 50/50 sheath/core spinnerets configuration where both sheath and core have the same materials composition. Spunbond nonwovens are made by the porous collection belt and adjusting the belt speed to target 25 grams per square meter (gsm). The collected fibers are first passed through a heated press roll at 75 degrees Celsius at 20 psi (pounds per square inch) and then a heated calendering system for the final thermal point bonding, followed by winding the continuous spunbond nonwoven onto a roll for later property measurements. The heated calendering system includes a heated engraved roll and heated smooth roll. The heated engraved roll has a raised bonding area. The calender roll pressure is held constant at 20 psi and the line speed of the forming belt is held constant at 40 meters per minute. The specific fibers and the processes for making them are shown below.

|  |  | Sheath Extruder | | | | Core Extruder | | | |
| --- | --- | --- | --- | --- | --- | --- | --- | --- | --- |
| Sheath | Core | Zone 1 Temp [° C.] | Zone 2 Temp [° C.] | Zone 3 Temp [° C.] | Zone 4 Temp [° C.] | Zone 1 Temp [° C.] | Zone 2 Temp [° C.] | Zone 3 Temp [° C.] | Zone 4 Temp [° C.] |
| PH835 | PH835 | 180 | 189 | 210 | 220 | 180 | 190 | 209 | 220 |
| Ex. 1 1% PLA | 1% PLA | 180 | 189 | 210 | 220 | 180 | 190 | 211 | 220 |
| Ex. 2 3% PLA | 3% PLA | 180 | 190 | 210 | 220 | 180 | 190 | 210 | 220 |
| Ex. 3 5% PLA | 5% PLA | 180 | 189 | 210 | 220 | 180 | 190 | 209 | 220 |

Embodiments of the nonwoven substrate of the present disclosure are tested and various properties are compared to a nonwoven substrate not having any engineering thermoplastic polymers within fibers of the nonwoven substrate. In the examples below, the engineering thermoplastic polymer (ETP) tested include varying levels of polylactic acid (PLA).

Examples:

| Resin | Basis Wt (gsm) | Fiber Diameter (um) | CD Peak Load (N) | MD Peak Load (N) | CD Elongation at Break (%) | MD Elongation at Break (%) | Average MD Tensile Modulus of Nonwoven (N/mm) | MD Tensile Modulus/ BW |
| --- | --- | --- | --- | --- | --- | --- | --- | --- |
| 100% PP 0% PLA | 25 | 20 | 12.13 | 19.79 | 66.02 | 65.24 | 3.36 | 0.13 |
| Example 1 1% PLA | 25 | 20 | 13.54 | 22.8 | 66.62 | 65.69 | 3.93 | 0.16 |
| Example 2 3% PLA | 25 | 20 | 11.4 | 20.7 | 81.61 | 76.33 | 4.31 | 0.17 |
| Example 3 5% PLA | 25 | 20 | 12.46 | 18.06 | 108.73 | 93.88 | 5.00 | 0.20 |

Figure 1:
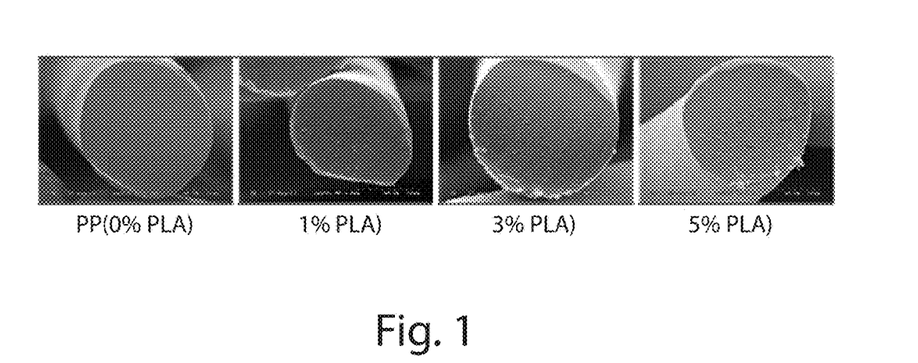
FIG. 1 an SEM of a cross section of PLA/PP nonwoven fibers.

FIG. 1 shows a cross section of PLA/PP nonwoven fibers via Scanning Electron Microscopy (SEM). PLA domains are best determined by visual inspection under scanning electron microscopy. Nonwoven fibers are cross-sectioned using a microtome blade and liquid nitrogen to assist in the cut quality. The fiber sample may be first dipped in liquid Nitrogen and removed. While still extremely cold, the microtome blade is used to quickly cut along the CD thus exposing a cross section of the fibers. The cross section is then mounted into a split mount SEM mount and maybe sputter coated with a thin layer of gold. The cross section is then examined under 500×-4000× magnification to look for the presence of discrete PLA domains. The SEM equipment may be a Hitachi TM-1000.

As indicated in FIG. 1, PLA does not mix with the PP matrix, even after compounding and fiber spinning. PLA is dispersed within the polyolefin and is visible even at lower concentrations.

Methods:

All tensile measurements are measured by the IVDA WSP 110.4 (05) (Option A) tensile testing method with following revisions:

Sample size: 2" gauge×1" width

Crosshead speed: 50 mm/min

MD Tensile Modulus of Nonwovens are measured by defining the maximum slope of the initial (<20% strain) portion of the tensile curve, where slope is defined as the change in force divided by the change in displacement and has units of N/mm. This modulus represents the initial resistance of the nonwoven to tensile deformation. The higher the modulus, the greater the nonwoven's resistance to deformation (i.e., the "stiffer" it is).

Indexed MD tensile modulus=((MD tensile modulus of nonwoven y)−(MD tensile modulus of nonwoven x)/MD tensile modulus of nonwoven x)×100;

where nonwoven x comprises of 0% PLA resin and nonwoven y comprise of 1, 3 or 5% PLA resin.

Any substrate being tested may be harvested from a finished product by any method that does not damage the specimen (e.g. solvent or freeze spray).

Nonwoven substrates of the present disclosure comprising engineering thermoplastic polymers have improved tensile properties versus nonwovens without the engineering thermoplastic polymers.

Figure 2:
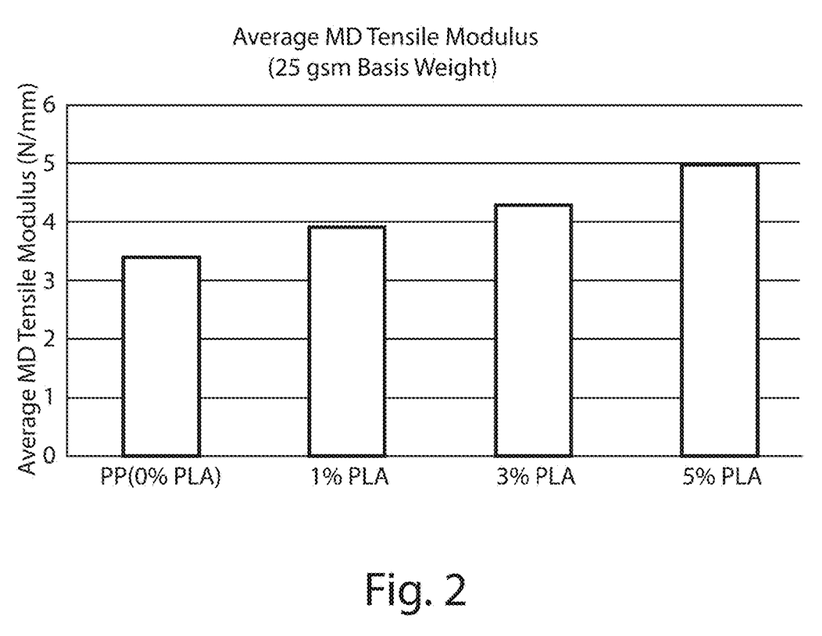
FIG. 2 is a graph of Average MD Tensile Modulus (25 gsm Basis Weight) of various nonwoven substrates of the present disclosure.

As shown in FIG. 2, nonwoven substrates of the present disclosure may have an average MD Tensile Modulus, at a constant basis weight of 25 gsm, of greater than about 3.5, greater than about 3.75, greater than about 4.00 N/mm.

Figure 3:
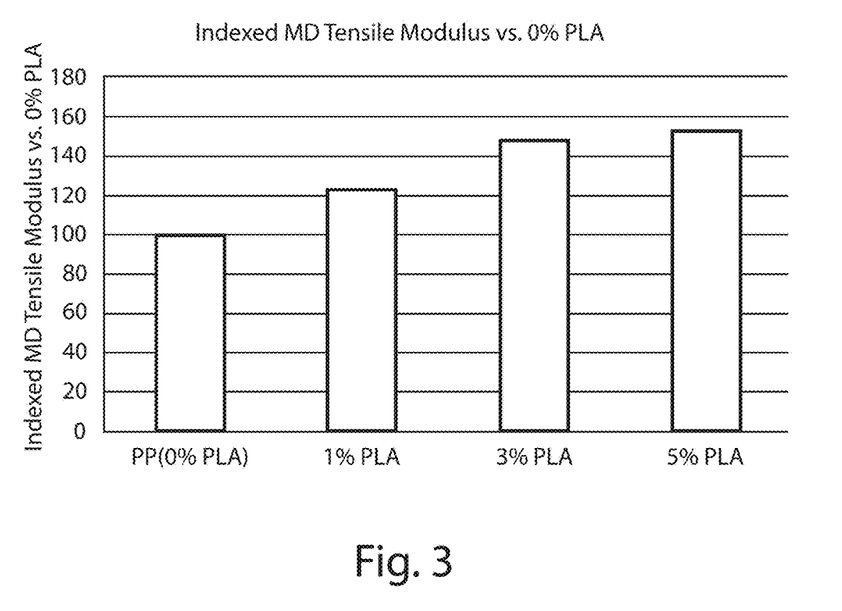
FIG. 3 is a graph of Indexed MD Tensile Modulus of various nonwoven substrates of the present disclosure.

As shown in FIG. 3, nonwoven substrates of the present disclosure having engineering thermoplastic polymers may have an indexed MD Tensile Modulus compared to nonwovens without engineering thermoplastic polymers that is greater than about 20%, greater than about 30%, greater than about 40%.

Figure 4:
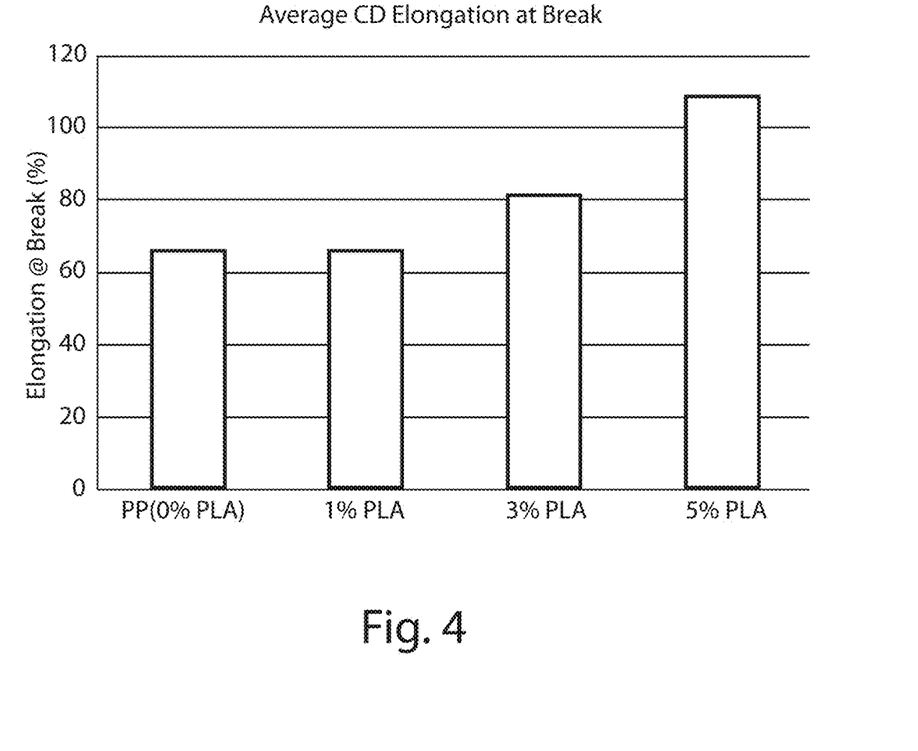
FIG. 4 is a graph of Average CD Elongation at Break of various nonwoven substrates of the present disclosure.

Further, as shown in FIG. 4, nonwoven substrates of the present disclosure comprising engineering thermoplastic polymers may have a CD Elongation at Break of greater than about 65%, greater than about 70%, greater than about 75%, greater than about 80%.

Figure 5:
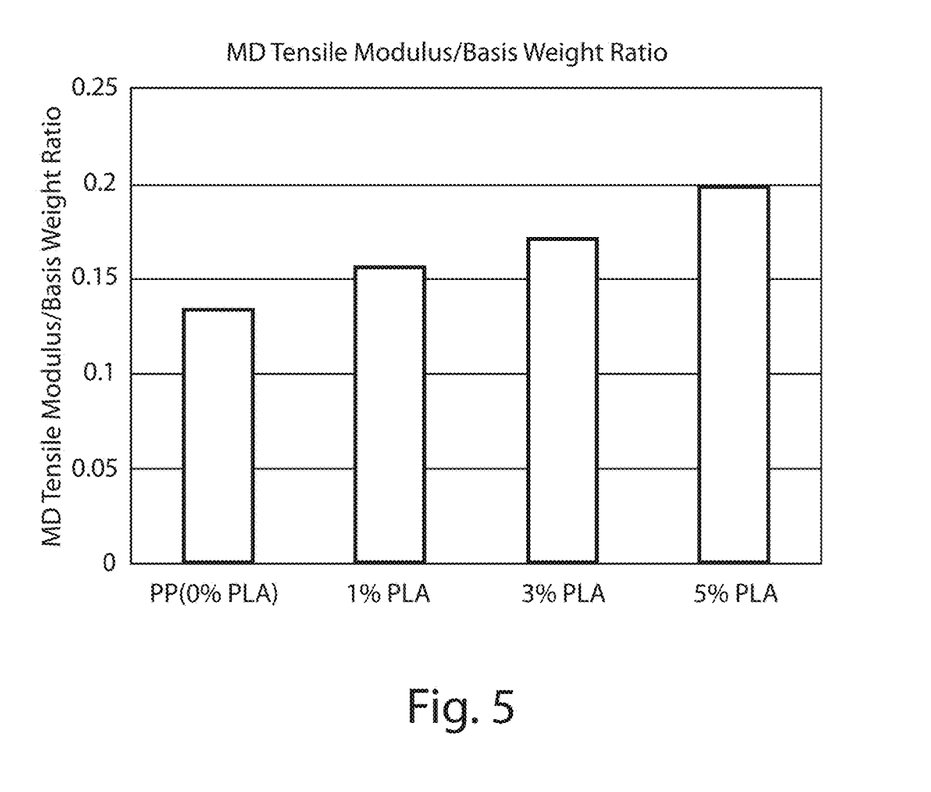
FIG. 5 is a graph of MD Tensile Modulus/Basis Weight Ratio of various nonwoven substrates of the present disclosure.

Also, as shown in FIG. 5, nonwoven substrates of the present disclosure comprising engineering thermoplastic polymers may have MD Tensile Modulus to nonwoven substrate basis weight ratio of from about 0.10 to about 1.0, from about 0.12 to about 0.50, from about 0.15 to about 0.4, greater than about 0.10, greater than about 0.12, greater than about 0.15.

Figure 6:
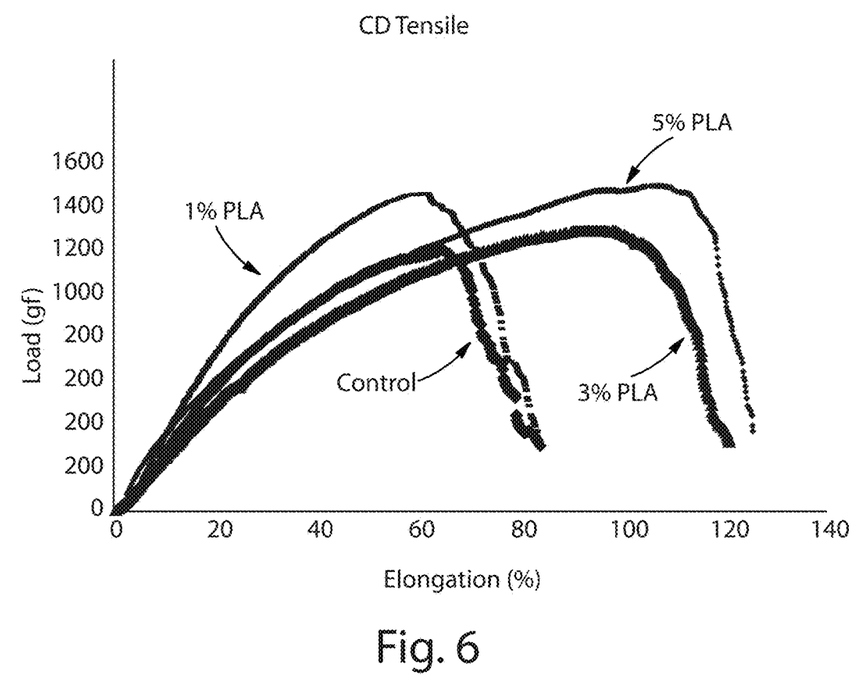
FIG. 6 is a graph of CD Tensile of various nonwoven substrates of the present disclosure.

FIG. 6 further shows that CD Tensile improves with inclusion of engineering thermoplastic polymers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications may be made without departing from the spirit and scope of the present disclosure. It is therefore intended to cover in the appended claims all such changes and modifications that are within the scope of this disclosure.

What is claimed is:

1. A nonwoven substrate comprising:
a layer of fibers, wherein the fibers comprise a polyolefin, an engineering thermoplastic polymer, and a plasticizer, wherein the plasticizer is present in the range of from about 1% to about 20% by weight of the nonwoven substrate, wherein the engineering thermoplastic polymer is present in amount of up to about 20% by weight of the nonwoven substrate, and wherein the engineering thermoplastic polymer comprises polyester.

2. The nonwoven substrate of claim 1, wherein the engineering thermoplastic polymer is present in the range of from about 1% to about 10% by weight of the nonwoven substrate.

3. The nonwoven substrate of claim 1, wherein the engineering thermoplastic polymer is present in the range of from about 2% to about 7% by weight of the nonwoven substrate.

4. The nonwoven substrate of claim 1, wherein the layer of fibers is free of compatibilizer.

5. The nonwoven substrate of claim 1, wherein the plasticizer is selected from the group consisted of Citrates, Adipates, Esters, Glycerols, oils, phthalate free plasticizers, bio-based plasticizers, and mixtures thereof.

6. The nonwoven substrate of claim 1 wherein the fibers are selected from the group consisting of spunbond, carded, meltblown fibers, and microfibers.

7. The nonwoven substrate of claim 1 wherein the fibers are selected from the group consisting of monocomponent fibers, bicomponent fibers, and multicomponent fibers.

8. The nonwoven substrate of claim 1 wherein the nonwoven substrate is present in an absorbent article selected from the group consisting of a pant, a taped diaper, a feminine hygiene product, and adult incontinence product.

9. A nonwoven substrate comprising:
a layer of fibers, wherein the fibers comprise a polyolefin, an engineering thermoplastic polymer, and a plasticizer, wherein the layer of fibers is free of compatibilizer and wherein the ratio of MD Tensile Modulus to basis weight of the nonwoven substrate is from about 0.10 to about 1.0.

10. The nonwoven substrate of claim 9 wherein the engineering thermoplastic polymer is present in amount of from about 1% to about 20% by weight of the nonwoven substrate.

11. The nonwoven substrate of claim 9 wherein plasticizer is selected from the group consisted of Citrates, Adipates, Esters, Glycerols, oils, phthalate free plasticizers, bio-based plasticizers, and mixtures thereof.

12. The nonwoven substrate of claim 9 wherein the engineering thermoplastic polymer is selected from the group consisting of polylactic acid (PLA), Polyimides, acrylates, methacrylates, styrenics, Polycarbonates (PC), Polytetrafluoroethylene (PTFE/Teflon), Acrylonitrile butadiene styrene (ABS), Polyphenylene oxide (PPO), Polysulphone (PSU), Polyetherketone (PEK), Polyetheretherketone (PEEK), Polyphenylene sulfide (PPS), Polyoxymethylene plastic (POM/Acetal), polyvinyl chloride and mixtures thereof.

* * * * *